UNITED STATES PATENT OFFICE.

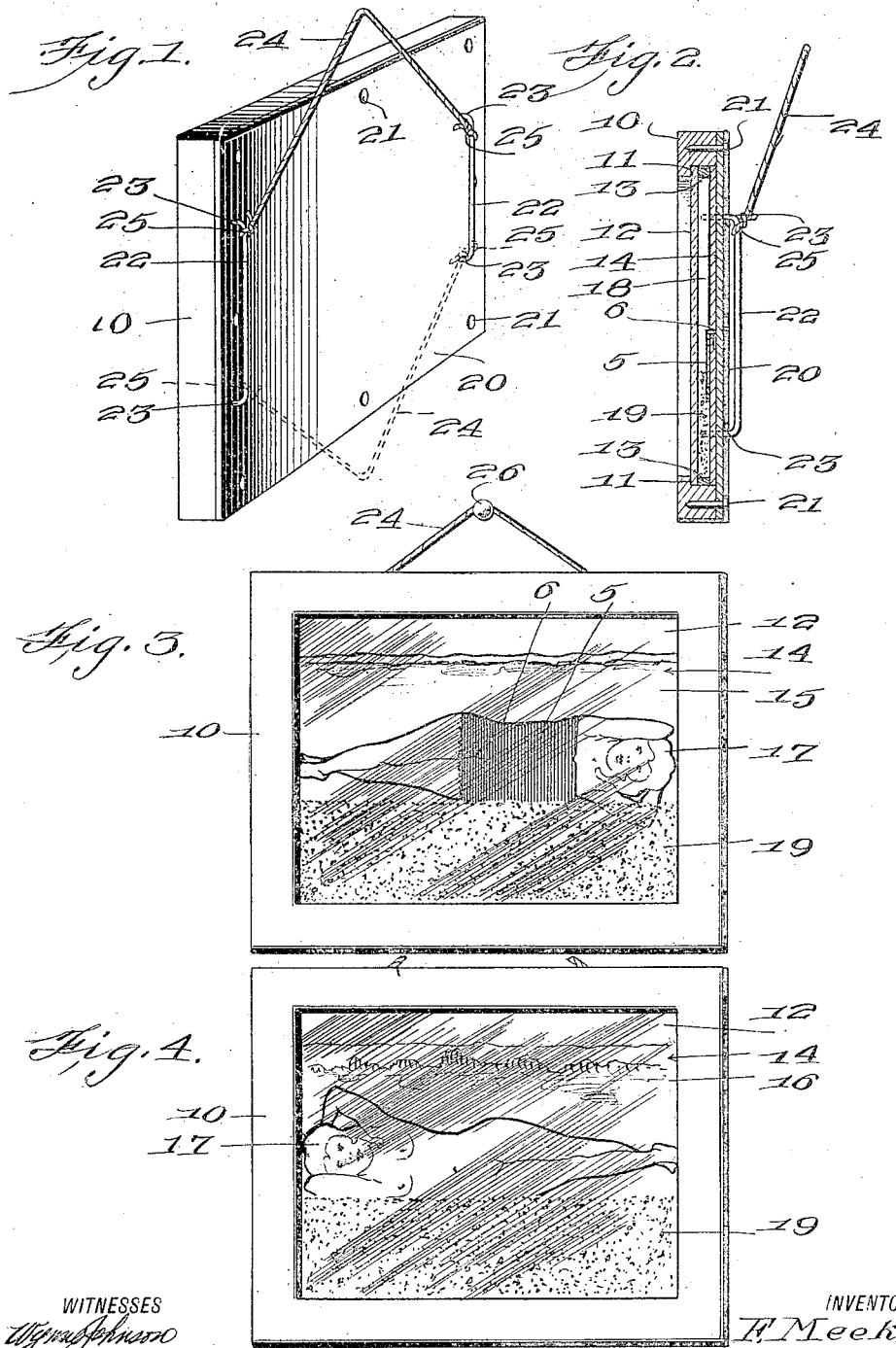

FRED MEEKS, OF LOS ANGELES, CALIFORNIA.

DUPLEX PICTURE.

1,379,642.  Specification of Letters Patent.  Patented May 31, 1921.

Application filed September 9, 1920. Serial No. 409,147.

*To all whom it may concern:*

Be it known that I, FRED MEEKS, a citizen of the United States, and a resident of Los Angeles, in the county of Los Angeles and State of California, have invented certain new and useful Improvements in Duplex Pictures, of which the following is a specification.

This invention has reference to an improved duplex picture frame arranged with a glass or transparent panel or front and provided with a space between the picture and the panel adapted to accommodate sand or other movable material therebetween, with means for holding, suspending or supporting the picture in inverted positions, so that different scenes depicted on the picture will be independently exhibited.

The invention therefore contemplates an improved picture frame construction with means for preventing the escape of the sand or other movable material located in the space between the front panel or cover glass and the picture, together with improved means for hanging the picture in inverted positions for the purposes above stated.

Other and further objects of my invention will become readily apparent to persons skilled in the art, from a consideration of the following description when taken in conjunction with the accompanying drawings, wherein:—

Figure 1 is a rear perspective view of the improved duplex picture and showing means for hanging or suspending the same, Fig. 2 is a transverse vertical sectional view of the device, Fig. 3 is a front elevation showing the picture in one position, and Fig. 4 is a similar view showing the picture inverted.

Referring to the drawings in detail, in which like reference characters designate corresponding parts throughout the several views, my improved duplex picture is shown as embodying a rectangular or other shaped frame 10, preferably of wood and provided at the inside with a rabbeted portion 11 forming a groove for receiving the surrounding edges of a transparent front panel or cover glass 12, it being understood that said front may be of glass, celluloid or other transparency.

A groove is provided to receive said front panel or cover, a backing of plaster or other plastic material, as indicated at 13, being provided in rear of the rabbeted portion 11, in order to retain the glass cover in position against the front shoulder, in order to prevent loosening of the panel and to form a perfectly tight joint, for a purpose to be hereinafter more particularly set forth.

At the back of the frame and within the same, there is provided a picture or scenic production 14 of a duplex character, in that the same presents a scene 15 at one side of the longitudinal center, represented as depicting a body of water, a beach or otherwise, while the other picture designated at 16, more particularly represents a beach scene in connection with the breakers or washing waves, although it is to be understood that any other suitable scenery may be provided, in connection with object 17, or otherwise.

Between the picture and the cover glass or panel, a space 18, preferably about one-half of an inch in thickness, due to the similar spacing of the picture from the front or cover glass, is provided so as to receive between said glass and the picture and within the space 18, sand or other movable material, as designated at 19, is provided. Sufficient of this material is provided preferably occupying about one third of the area of the space so that when the picture is suspended or supported in the position or manner shown in Fig. 3 of the drawings, the scene 15 will be exposed at the top, the scene 16 and the object 17 being covered by the sand at the bottom and the object 17 by the cloth, due to the automatic assumption of such position by the sand when the picture is so arranged. That is, the sand or the like will fill the space 18 at the bottom portion, thus presenting the scene of a beach and a body of water looking outwardly from the beach together with the girl in the bathing suit. On the other hand, when the picture is inverted or disposed in the position shown in Fig. 4, the sand or the like will cover the scene 15 and expose the scene 16 and object 17, depicting the beach, together with the breakers or washing waves. Also, a portion of the sky line is shown in each picture and it is obvious that other scenes may be substituted for the ones represented in the drawings as illustrative of the inventive idea and embodiment above set forth.

In the form of the invention illustrated, in one position the piece of cloth covers the body, from shoulder to knee, and the sand covers the lower part of the picture up to the body, it covers a little of the lower arm and leg and the loose end of cloth that covers the body. It is supposed to be a girl in a bathing suit lying on the sand. The other position the body is nude, the sand covers all of the cloth and a little of the lower leg and arm.

Suitable means is provided for supporting the picture in inverted positions in order to carry into effect the above objects, and in accordance with the preferred embodiment of the invention, suitable means for hanging or suspending the picture in this manner is provided. At the back, there is arranged a backing 20 suitably secured in position to the frame, as through the medium of fasteners 21, shown in the form of brads or tacks. At each side of the frame at the back, there is arranged a wire or bar 22 having its ends extended inwardly at right angles to the intermediate portion as shown at 23, the same being in the form of elongated or widened staples the legs of which form securing means whereby the imposed bars formed by the staples, are arranged in parallel relation at opposite sides vertically of the picture and frame to form hanging or suspension means whereby the picture may be supported in inverted positions. For this purpose, a cord or like hanger 24 is provided having its ends tied or looped around said staples or intermediate bight portions of the bars, as indicated at 25, so as to freely slide from one end to the other as shown in solid and dotted lines in Fig. 1 of the drawings, in order that the picture may be supported as shown in Fig. 3, or in an inverted position as shown in Fig. 4, from a nail or other suspension means indicated at 26. It will be understood that when the picture is inverted the sand or other movable material designated at 19, will readily move by gravity from the top to the bottom of the space 18, so as to expose either scene or picture as desired. Of course, it is to be understood that in connection with the space provided, between the glass panel or cover and picture, any other suitable material may be substituted for the sand, such as snow, and that the picture or scenes may be modified accordingly.

A representation of a bathing suit in the form of a translucent, transparent or diaphanous or thin cloth covering 5, such as crêpe-de-chine, silk, georgette or the like, representing the bathing suit, is fitted or secured at one edge, preferably between the back of the picture and the backing 20, the same being glued or otherwise fitted or secured at one edge in a slot 6 in the picture along or at the edge or marginal edge of the abdomen of the body or object 17 so as to partially cover the object in one position. The shifting or movable material such as sand, covers the lower scene, the free end of the cloth and a portion of the body, in one position and in the other position, it leaves the body uncovered or exposed when the picture is inverted, the upper scene in each instance being also exposed to view. It will be also understood that the shifting or movable material or sand assists in the movement of the cloth over the body or object, to the different positions referred to, the cloth being held between the surface of the picture and the said material. Furthermore, owing to the picture or scene at one side being the same size as that at the other side, the area at each side of the object or body is the same and said object or body 17 is at or very near the center of the picture from the top or bottom and thus the beach, water or scene at the top or bottom requires exactly the same amount or volume of sand, constituting the movable or shifting material, so that the latter will come or strike comparatively the same place on the body in either position for the purpose of carrying out the objects and design as heretofore referred to.

In view of the foregoing, it is thought that the operation of the device will be readily understood and in view of the simplicity and practical value that it will commend itself to those skilled in the art.

Having thus described my invention, I claim:

1. In a duplex picture, a frame having a transparent front panel and a picture at the back thereof spaced from said panel, said picture having a plurality of complete scenes adapted to be viewed in different positions, and a movable or shiftable material of finely divided particles disposed in the space between the panel and picture adapted to leave one of said pictures exposed when the frame is in one position and to cover the other picture, said material being adapted to cover said exposed picture and to uncover said covered picture, when the frame is inverted.

2. In a duplex picture, a frame having a transparent front panel and an opaque picture at the back thereof spaced from said panel, said picture having a plurality of scenes and an intermediate body adapted to be viewed in different positions, and a movable or shiftable material in the space between the panel and picture adapted to cover all but one of said pictures and said body in each position of the frame, said frame having means to support the same in different positions.

3. In a duplex picture, a frame having a transparent front panel and an opaque picture at the back thereof spaced from said panel, said picture having a plurality of scenes adapted to be viewed in different positions, and a vertically movable or shiftable granular-like material in the space between the panel and picture adapted to leave one of said pictures exposed when the frame is in one position, said frame having a back portion over the picture and said back portion being provided with means to suspend the picture in inverted positions whereby said material will be caused to cover different pictures and to expose others in the different positions.

4. A device of the class described comprising a frame, a transparent front panel for the frame, a closure for the back of the frame having a plurality of scenes depicted thereon in reverse positions and opaque shiftable finely divided material between said back portion and the panel and adapted to alternately cover one of the scenes.

5. In a duplex picture, a frame having a rabbeted portion, a cover glass set in said rabbeted portion, a plastic retainer for said glass in said rabbeted portion at the back of the glass, a cover at the back of the frame and having a picture within the frame having pictures or scenery disposed thereon in reversed positions, and movable material such as sand, disposed in the space between the glass and the back portion and picture, to cover one of said scenes in one position of the picture and to leave the other picture uncovered, while acting reversely in the other position of the picture.

6. In a duplex picture, a frame having a rabbeted portion, a cover glass set in said rabbeted portion, a plastic retainer for said glass in said rabbeted portion at the back of the glass, a cover at the back of the frame and having a picture within the frame having pictures or scenery disposed thereon in reversed positions, a shiftable and substantially granular material between the cover glass and the back portion and picture, and means carried by the back portion for use in suspending the picture in inverted positions of the latter at the point above the longitudinal axis thereof when the scene above said longitudinal axis is exposed to view.

7. The combination with a duplex picture or the like, including a frame having a transparent front panel, said frame having a groove receiving said panel and retaining the same in position, a picture at the back of the frame in spaced relation to the panel, a back covering for the frame and suitably secured thereto, a shiftable pulverized or granular material in the space between the panel and the picture and occupying substantially one third of the area thereof to cover one view at a time, the joint between the panel and the frame serving to prevent escape of said material, elongated staples placed vertically at the sides of the frame and a suspension cord slidably engaged therewith for hanging the picture in inverted position at opposite ends of said staples.

8. In a duplex picture, a frame having a rabbeted portion, a transparent panel or cover plate set in said rabbeted portion, a retainer for said panel in said rabbeted portion at the back of the panel, a double scene picture within the frame adapted to be disposed in reversed positions and a movable granular material disposed in the space between the panel and the back portion and picture to cover one of said scenes in one position of the picture and to leave the other scene uncovered, while acting reversely in the other position of the picture.

9. In a duplex picture, a frame having a transparent front panel and a picture at the back thereof spaced from said panel, said picture having a plurality of scenes adapted to be viewed in different positions, a body intermediate the scenes and a movable or shiftable material in the space between the panel and the picture adapted to cover one of the scenes and leave one of said scenes exposed when the frame is in one position and vice versa and to approach the marginal top or bottom edges of the body alternately for covering or uncovering said body.

10. In a duplex picture, a frame having a transparent front panel and a picture at the back thereof spaced from said panel, said picture having a plurality of scenes adapted to be viewed in different positions and a central body or object, and a movable or shiftable material in the space between the panel and picture adapted to cover all but one of said pictures and the object in each position of the frame, and a covering actuated by the material to cover or uncover the object.

11. In a duplex picture, a frame having a transparent front panel and a picture at the back thereof spaced from said panel, said picture having a plurality of scenes adapted to be viewed in different positions, and a central body or object provided with a slit at one side or marginal edge and a flexible cloth covering secured in the slit at one edge with the other edge free to cover or uncover the object, and a movable granular material in the space between the panel and picture adapted to cover one scene in inverted positions of the picture, said material covering the cloth in one position and exposing the same, except its free edge, in the other position.

12. In a device of the class described a frame having a cover glass or transparent front panel and a picture at the back thereof spaced from the panel to provide a space there between, scenes at the top and bottom portions of the picture, an intermediate picture centrally located between such scenes, and a movable or granular material between the panel and the picture in the space provided there between, said material being adapted in inverted positions of the picture to cover the said scenes independently whereby the other and the intermediate picture will be exposed in combination.

13. The combination with a duplex picture including inverted scenes, a central body or object between said scenes, and an inclosed space in front of the picture filled with movable material of finely divided particles adapted to cover only the lower scenes in the inverted positions of the device; of suspension means for the device adapted to hold the same in inverted positions.

14. In a duplex picture, a frame having a transparent front panel and a picture at the back thereof spaced from said panel, said picture having a plurality of scenes adapted to be viewed in different positions and a central body or object, and a movable or shiftable material in the space between the panel and picture adapted to cover all but one of said scenes and the object in each position of the picture.

FRED MEEKS.